March 25, 1969  R. W. SEXTON ETAL  3,434,700
GAS-LIQUID CONTACT APPARATUS FOR GAS CLEANERS
Filed April 24, 1967
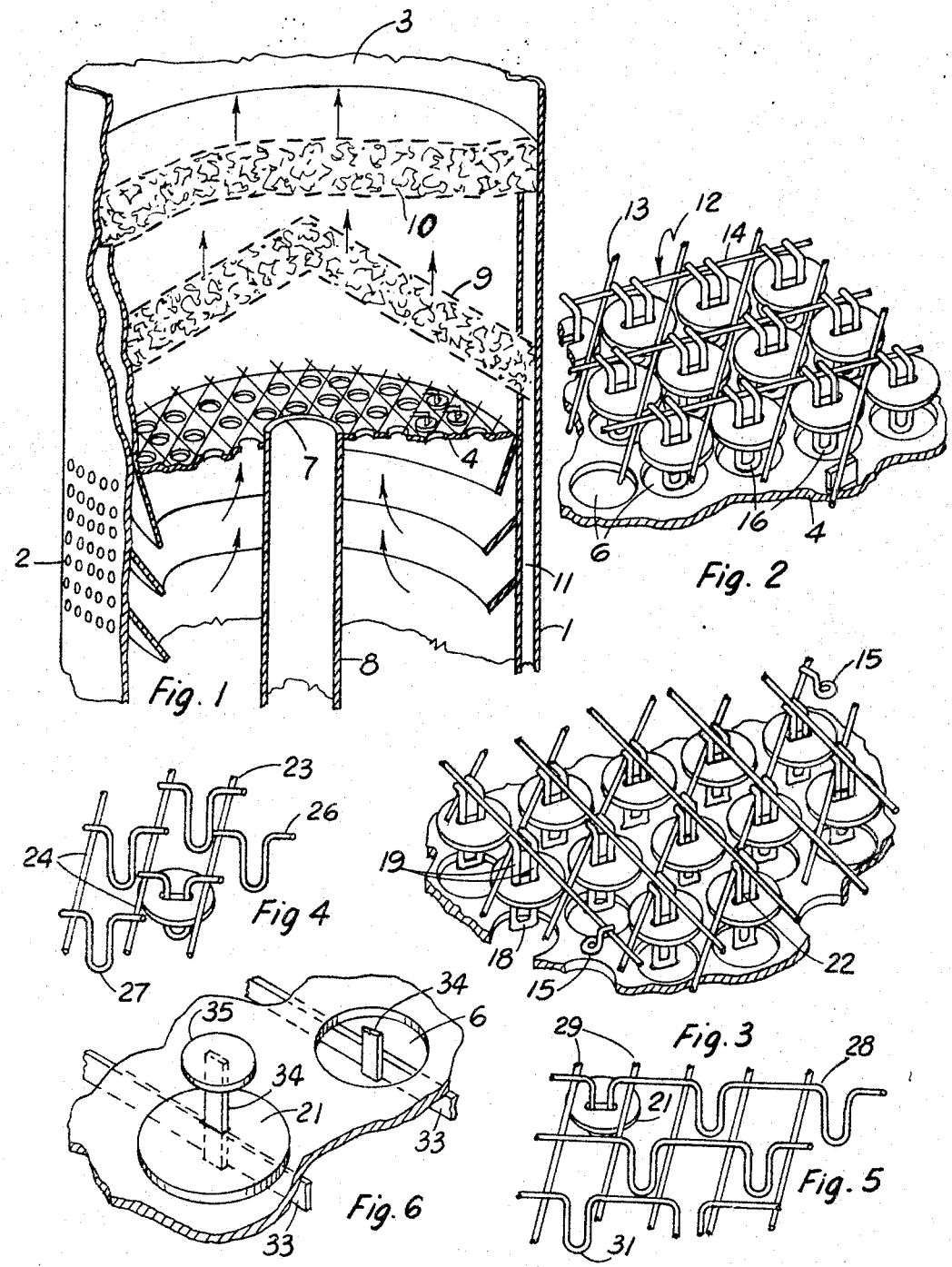
INVENTORS
George J. Akers
Robert W. Sexton
BY
Ralph B. Brick

United States Patent Office

3,434,700
Patented Mar. 25, 1969

3,434,700
GAS-LIQUID CONTACT APPARATUS FOR GAS CLEANERS
Robert W. Sexton, Louisville, and George J. Akers, Pleasure Ridge Park, Ky., assignors to American Air Filter Company, Inc., Louisville, Ky.
Filed Apr. 24, 1967, Ser. No. 633,000
Int. Cl. B01d 47/02
U.S. Cl. 261—109                6 Claims

ABSTRACT OF THE DISCLOSURE

An improved gas-liquid contact arrangement for a gas cleaning apparatus including a gas-liquid contacting tray having a plurality of spaced openings therein and a grid arrangement for supporting a plurality of valves in spaced, cooperative relation with the openings.

Background of the invention

The present invention pertains to fluid filtration and finds particular utility in the gas separation art wherein particulate materials are separated from a gaseous stream by utilization of gas-liquid contact.

Various types of gas-liquid contact apparatus are known in the art of gas filtration, such apparatus employing gas-liquid contact trays upstream the filtering sections of the gas cleaning apparatus. In order to control the amount of gas through the system and to provide the desirable gas-liquid contact, various valve arrangements have been employed in the past to cooperate with the openings in the contact trays. For the most part, these past valve arrangements have been complex and expensive in construction, installation, and operation, each valve being individually designed for assembly with an individual opening, not only consuming substantial amounts of costly materials, but requiring a considerable amount of time in fabrication, construction and maintenance.

Summary of the invention

In accordance with the present invention, a new, useful, and unobvious gas-liquid contact apparatus is provided which lends itself to ready and economical fabrication, construction and maintenance, utilizing a minimum amount of materials and requiring a minimum of time for installation. Further, the structure of the present invention is particularly adapted for replacement of worn valves in prior arrangements. In addition, the novel structure of the present invention insures ready and efficient operation with a minimum of operating parts.

In addition, the present invention provides a novel arrangement for supporting individual valve members so as to avoid rotational movement and to insure that the valve members can be properly maintained on the support arms from which they are suspended.

Various other features of the present invention will become obvious to one skilled in the art upon reading the disclosure set forth hereinafter.

More particularly, the present invention provides a gas-liquid contacting apparatus comprising: a gas-liquid contact tray adapted to be mounted horizontally within a gas cleaning apparatus to retain a body of liquid thereon, the tray having a plurality of spaced flow apertures therein through which the gas to be treated is passed; and a unitary flow-through grid member adapted to be mounted horizontally within the gas cleaning apparatus in cooperative relationship with the contact tray, the grid member having a plurality of spaced support arms extending normally therefrom in alignment with the flow apertures, the valve members being slidably mounted on the support arms to cooperate with the flow apertures so as to control the flow of gas therethrough.

It is to be understood that various changes can be made in the arrangement, form, and construction of the apparatus disclosed herein without departing from the scope or spirit of the present invention.

Referring to the drawing which discloses an advantageous embodiment of the present invention and several modifications thereto:

FIGURE 1 is an elevational, partially broken away view of a gas cleaning apparatus incorporating the novel gas-liquid contacting arrangement of the present invention;

FIGURE 2 is an enlarged fragmentary isometric view of the gas-liquid contacting arrangement of FIGURE 1;

FIGURE 3 is a fragmentary view of a modified gas-liquid contacting arrangement;

FIGURE 4 is a fragmentary isometric view of still another gas-liquid contacting apparatus in accordance with the present invention;

FIGURE 5 is still a further modified arrangement of the present invention in isometric fragmentary form; and FIGURE 6 discloses still a further fragmentary isometric view of a further modification of the present invention.

As disclosed in FIGURE 1 of the drawings, the apparatus of the present invention can be utilized in combination with a gas cleaning assembly which includes cylindrical outer housing 1 having perforated dirty gas inlet 2 along the side thereof and downstream clean gas outlet 3. Disposed to extend in horizontal fashion across the interior of gas cleaning housing 1 is gas-liquid contact tray assembly 4 which incorporates the novel gas-liquid contacting apparatus.

As can be seen in FIGURES 1 and 2 of the drawings, the gas-liquid contact tray 4 is provided with a plurality of spaced apertures 6 and has centrally disposed therein a large aperture 7 which cooperates with a suitable liquid lift conduit 8. It is to be understood that any one of a number of suitable devices can be used, as is known in the art, to introduce liquid through conduit 8 onto the upper surface of gas-liquid contact tray 4. Positioned in spaced relation downstream of gas-liquid contact tray 4 are two filters 9 and 10, both filters as disclosed being adapted to drain along side conduit 11.

Referring to FIGURE 2 of the drawing, details of the novel unitary flow-through grid member 12 of the present invention are disclosed. Grid member 12 is comprised of crossed sets of spaced parallel bars 13 and 14, which are connected together by some suitable means such as welding, and which are adapted to be mounted horizontally within gas cleaning housing 2 in spaced cooperative relation on gas-liquid contacting tray 4 by means of a number of suitably spaced, normally extending, support legs 15, each of which has one end fastened to grid 12 and the other fastened to tray 4 (FIGURE 3). Grid member 12 is further provided with a plurality of spaced valve support arms 16 extending normally therefrom in alignment with the flow openings. As shown in both FIGURES 2 and 3 of the drawings, valve support arms 16 are comprised of U-shaped rod members including base sections 18 and spaced parallel legs 19, the extremities of legs 19 being fastened to grid 12. As disclosed in FIGURE 2 of the drawing, legs 19 can be fastened in offset relation to the places were grid bars 13 and 14 cross with the grid positioned so that arms 16 are aligned with apertures 6. Or, as disclosed in FIGURE 3 of the drawing, grid 12 can be positioned so that the intersections of bars 13 and 14 are aligned with apertures 6 and the normally extending support arms 16 are connected to the grids at the intersections of bars 13 and 14. It has been found that this latter arrangement advantageously reduces the flow resistance of the apparatus.

Adapted to cooperate with support arms 16 in each of the embodiments of FIGURES 2 and 3 are valve discs 21. Discs 21 can be provided with longitudinal slots 22 through which the spaced parallel legs 19 of arms 16 extend, the valve discs 21 being sized relative apertures 6 so that the edges of the valve members rest on the tray 4 when in closed position. It is to be understood that bases 18 of arms 16 can be crimped after discs 21 have been mounted on the arms so as to assure maintenance of the discs on the arms during assembly operations.

Referring to FIGURE 4 of the drawing, still another embodiment of the present invention is disclosed. This embodiment includes a grid member 23 comprised of a first set of spaced parallel bars 24 which can be adapted to extend longitudinally across the breadth of the tray. A second set of spaced parallel segmentary bars 26 of grid 23 are arranged with the bars of adjacent rows being in alternating offset fashion and with each segmentary bar 26 having its ends intersecting parallel bars 24 of the first set between which it is positioned, bars 24 and 26 being connected at their intersections by some suitable means such as welding. It is to be noted that segmentary bars 26 are hook-shaped in configuration to include support arms 27 in integral fashion therewith, such support arms 27 serving to pass through slots 22 of valve disc 21 in a manner similar to support arms 16.

As can be seen in FIGURE 5 of the drawing, instead of making bars 26 as separate segments, it is possible to make such bars as continuous longitudinal bars 28 crossing parallel bars 29 and having integral distending support arms 31, the distending arms 31 being positioned in offset relationship with respect to each other so that the valve discs 21 mounted thereon cooperate with apertures 6 of contact tray 4.

Referring to FIGURE 6 of the drawing, a further embodiment of the present invention is disclosed wherein parallel bars 33 are shown as mounted directly to the lower portion of contact tray 4 and are provided with normally extending flat valve support bars 34 which extend upwardly through apertures 6 to receive slotted valve discs 21. Fastened at the extremities of valve support bars 34 are suitable restraining discs 35, these restraining discs serving to insure that valve discs 21 do not come off of the bars.

From the foregoing description, it can be readily seen that the present invention provides a straightforward and economical construction for a liquid contacting tray which can be readily installed and operated with a minimum of expense and with a minimum of design.

The invention claimed is:

1. A gas-liquid contacting apparatus comprising: a gas-liquid contact tray adapted to be mounted horizontally within a gas cleaning apparatus to retain a body of liquid thereon, said tray having a plurality of spaced flow apertures therein through which the gas to be treated is passed; a unitary flow-through grid comprised of crossed sets of spaced bars adapted to be mounted horizontally within said gas cleaning apparatus in cooperative relationship with said contact tray, said grid having a plurality of spaced support arms fixed to and extending normally from said spaced bars of said grid in alignment with said flow apertures, said support arms comprising U-shaped rod members, each including a base section and a pair of spaced parallel legs having their extremities opposite said base section, and valve members slidably mounted on said support arms to cooperate with said flow apertures to control the flow of gas therethrough, said valve members having longitudinal slots therein through which said spaced parallel leg members of said support arms extend with said extremities of said spaced parallel legs of said rod members being fastened to said grid.

2. The apparatus of claim 1, said sets of spaced bars of said grid member being in parallel relationship, said grid being so positioned relative said contact tray that the intersections of said crossed sets of bars are aligned with the centers of said flow openings, said normally extending support arms being connected to said grid at said intersections.

3. The apparatus of claim 1, said grid having a set of support legs extending normally therefrom whereby said grid can be mounted above said contact tray in spaced, parallel relationship with said support arms extending through said opening, said valve members being sized relative said opening that the edges of said valve members rest on said tray when in closed position.

4. The apparatus of claim 1, said grid comprising crossed sets of spaced, parallel bars with at least one set of said bars having a configuration to integrally include said spaced support arms.

5. The apparatus of claim 1, said grid comprising crossed sets of spaced, parallel bars with at least one set of said bars being of hook-shaped segments to provide said spaced support arms, said segments of adjacent bars being arranged in alternating offset fashion to each other.

6. The apparatus of claim 1, said grid comprising crossed sets of spaced, parallel continuous bars with at least one set of said bars having a configuration to integrally include said spaced support arms.

References Cited

UNITED STATES PATENTS

| | | |
|---|---|---|
| 999,320 | 8/1911 | Kyll. |
| 2,428,889 | 10/1947 | Nutter. |
| 2,525,064 | 10/1950 | Bragg. |
| 2,658,737 | 11/1953 | Nutter. |
| 2,772,080 | 11/1956 | Huggins et al. ____ 202—158 X |
| 2,819,050 | 1/1958 | Huggins et al. |
| 2,871,003 | 1/1959 | Galbreath. |
| 2,889,004 | 6/1959 | Nutting et al. _____ 55—255 X |
| 3,325,155 | 6/1967 | Bahout. |

RONALD R. WEAVER, *Primary Examiner.*

U.S. Cl. X.R.

137—512.1, 532.27; 55—255